Aug. 26, 1941.    N. E. NYLIN    2,254,045
ADJUSTABLE SHEAVE
Filed April 22, 1940
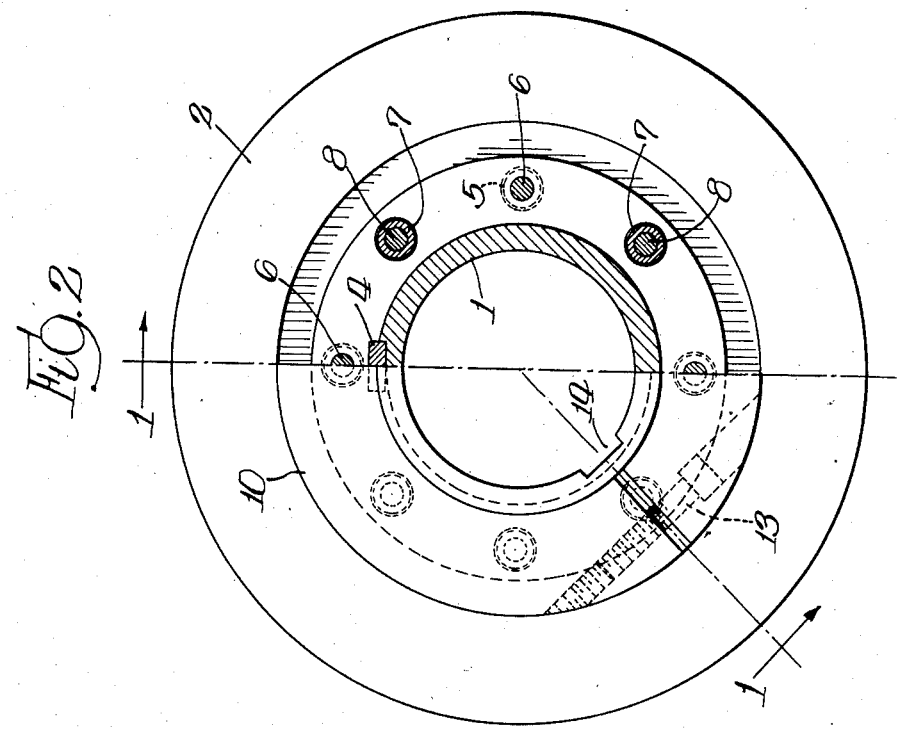
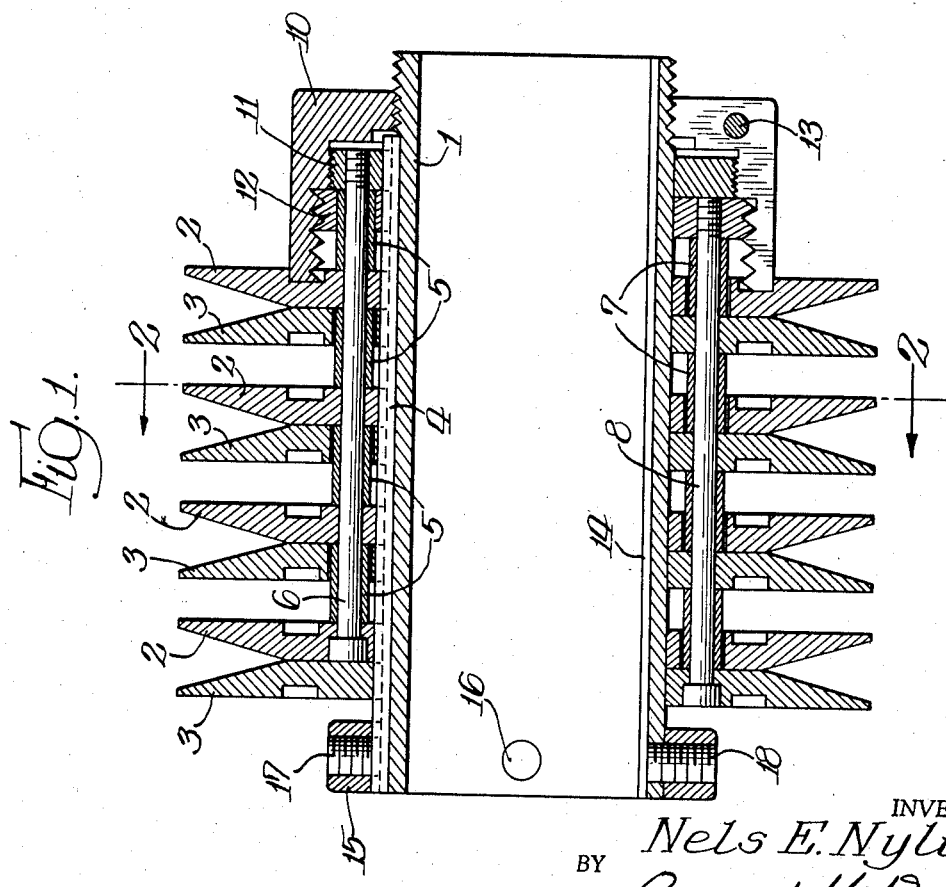
INVENTOR.
Nels E. Nylin,
BY Osgood H. Dowell
ATTORNEY.

Patented Aug. 26, 1941

2,254,045

UNITED STATES PATENT OFFICE 2,254,045

ADJUSTABLE SHEAVE

Nels E. Nylin, Chicago, Ill., assignor to Dodge Manufacturing Corporation, Mishawaka, Ind., a corporation of Indiana Application April 22, 1940, Serial No. 330,908

13 Claims. (Cl. 74—230.17)

This invention relates to belt and sheave drives, and more particularly to a grooved sheave which is adjustable by operation of adjusting means for varying the width of the sheave grooves, whereby in the case of a sheave for a V-belt drive or analogous drive to obtain variation in the pitch diameter of the sheave in such drive.

Multiple V-belt drives, of which an example is shown in United States patent to Geist No. 1,662,511 of March 13, 1928, are commonly used for driving between shafts centered at short distances apart. In such drives and other drives comprising a belt or belts having tractive engagement with driving and driven sheaves by coaction with the side walls of V-grooves of the sheaves, the ratio of the angular speeds of the driving and driven shafts is of course dependent upon the distances from the shaft centers which the belts assume in the V-grooves of the sheaves. It is therefore desirable in such a drive to provide a sheave capable of adjustment for varying its pitch diameter, in order to obtain adjustment of the speed of the driven shaft in relation to the speed of the driving shaft.

The object of the present invention is to provide an improved sheave of the adjustable type above indicated, and more particularly to provide an adjustable sheave of practicable character and construction, well adapted for manufacture on a mass production basis, and which as an element in a drive of the V-belt type can be adjusted to vary its pitch diameter without disturbing the alinement of the V-grooves of the driving and driven sheaves.

The invention will be best understood by reference to an illustrative embodiment thereof shown in the accompanying drawing, in which:

Fig. 1 is a longitudinal section of a variable pitch sheave for a multiple V-belt drive, of one practicable construction embodying the invention, the section being taken on different diametric planes indicated by the line 1—1 of Fig. 2.

Fig. 2 is a view half in end elevation, looking at the right hand end of Fig. 1, and half in cross section taken on the line 2—2 of Fig. 1.

The illustrative sheave comprises the hub member 1 to be mounted on a shaft in driving connection therewith, and the annular discs 2 and discs 3 carried by said hub member in driving connection therewith by means of the spline or key 4 but axially movable on the hub by operation of adjusting mechanism as hereinafter described. V-grooves of the sheave are provided each by a pair of discs, namely a disc 2 and a disc 3, having confronting beveled surfaces providing the groove side walls. All of the discs may be similar but they are arranged in alternately facing positions or in pairs cooperating to provide the sheave grooves. The whole assembly of discs may be considered as in two groups, namely the spaced discs 2 facing one way and arranged in alternation with the spaced discs 3 facing the opposite way. The discs 2 are spaced by the spacers 5, shown as tubular spacers slidable in holes therefor in the other discs and arranged in longitudinally alined series at intervals around the hub. By the spacers 5 and tie rods 6 passing therethrough the discs 2 are tied together in spaced relationship for movement as a unit. Likewise the discs 3 are spaced by spacers 7 similar to and arranged similarly to the first mentioned spacers and slidable in the discs 2. By the spacers 7 and tie rods 8 passing therethrough, the discs 3 are tied together in their spaced relationship for movement as a unit. The tie rods 6 and 8 are shown as long bolt screws, screwed into the adjusting members 11 and 12 hereinafter referred to. Thus the sheave structure comprises two inter-arranged axially movable units, each comprising spaced discs alternating and cooperating with those of the other to provide the opposite diverging walls of the V-grooves of the sheave. Spacing is provided between the pairs of discs which form the V-grooves, or in other words between the discs which are back to back, to allow a limited range of relative motions of the two groups of discs. The two groups of discs are normally held in fixed relation by their connection with the adjusting mechanism presently to be described.

Assuming the sheave to be engaged by a gang of parallel belts of V-shaped or trapezoidal cross section, having their flat lateral surfaces in contact with the diverging side walls of the V-grooves, or by ropes or other forms of belts wedgingly engaged with said side walls, it will be apparent that adjustment of the sheave to vary the width of the V-grooves will vary its pitch diameter in the drive in which the sheave is employed. The construction of the sheave is such as to permit adjustment by simultaneously moving in opposite directions the discs providing the opposite side walls of the respective V-grooves, i. e. by moving the group of discs 2 in one direction and simultaneously the group of discs 3 in the opposite direction. By moving the two groups of discs equal distances in opposite directions, the adjustment may be accomplished without shifting the centers of the V-grooves or disturbance of the alinement of the V-grooves of the driving and driven sheaves in the drive, so that the belts will have constant lateral surface contact with the V-groove walls and will move only vertically or at right angles to the sheave axis in accommodating themselves to variations in the pitch diameter. For so operating the discs I provide an adjusting mechanism comprising a nut 10 in screw-threaded engagement with the sheave hub and having relatively fine and coarse screw-threaded engagements with axially movable rings 11 and 12 respectively connected as shown with the respective sets of sheave discs 2 and 3. The fine pitch ring 11 is connected with the set of discs which are at the same sides of the groove centers as the adjusting mechanism. Thus in the illustrative construction, having the adjusting mechanism at the right hand end of the sheave as viewed in Fig. 1, the fine pitch ring 11 is rigidly connected by the bolt screws 6 with the group of discs 2 forming the right hand walls of the V-grooves, and the coarse pitch ring 12 is similarly connected by the bolt screws 8 with the set of discs 3 forming the left hand walls of the V-grooves. As shown, certain of the spacers 5 are interposed between the ring 11 and adjacent end disc, these spacers being slidable in the ring 12. Rotation of the pitch nut 10 in either direction will cause axial movements of the fine and coarse pitch rings 11 and 12 relative to the nut, and their axial motions relative to the sheave hub will be the differences between the axial movement of the nut and their axial motions relative to the nut.

The relationship of the three sets of screw threads may be such that rotation of the pitch nut 10 will impart axial movements to the rings 11 and 12 relative to the sheave hub in equal amounts in opposite directions. A preferred combination of screw threads to obtain this effect is as follows: The inter-engaging screw threads of the pitch nut 10 and sheave hub may be eight to the inch; those between the nut and fine pitch ring 11 twenty to the inch, and those between the nut and coarse pitch ring 12 five to the inch; all the screw threads being in the same direction i. e. either right handed or left handed as preferred. With this combination of screw threads of eight, twenty and five pitches, one complete rotation of the pitch nut 10 in either direction will move it axially ⅛ of an inch, while the fine pitch ring 11 moves axially relative to the nut 1/20 of an inch in the opposite direction, and thus has an axial movement relative to the sheave hub of ⅛"−1/20"=3/40". At the same time the coarse pitch ring 12 moves axially relative to the pitch nut ⅕ of an inch, so that its movement relative to the sheave hub is ⅛"−⅕"=3/40", i. e. an axial movement relative to the hub of 3/40 of an inch in the opposite direction to the axial movement of the fine pitch ring 11 relative to the hub. Thus by rotation of the nut 10 in one direction or the other, the pitch diameter of the sheave will be increased or decreased by axial movements of the groups of discs 2 and 3 in equal amounts in opposite directions, or by equal opposite movements of the side walls of the respective sheave grooves.

Other combinations of screw threads would give a similar effect, for instance threads of six, twelve and four to the inch between the nut and hub, nut and fine pitch ring and nut and coarse pitch ring would give, for a complete rotation of the nut, opposite movements of 1/12 of an inch of the opposite side walls of the V-grooves. Still another combination of screw threads which would fulfill conditions for obtaining equal movements would be nine, eighteen and six per inch on the elements 1, 11 and 12 respectively; giving for a complete rotation of the nut 10 opposite movements of 1/18 of an inch of the elements 11 and 12.

If $n_1$ is the number of screw threads per inch on the sheave hub, $n_2$ the number of threads per inch on the fine pitch ring 11 and $n_3$ the number of threads per inch on the coarse pitch ring 12, then the relation $$(1/n_1 - 1/n_2) = (1/n_3 - 1/n_1)$$

will result in equal opposite movements of 11 and 12 relative to the hub.

Suitable means is provided for locking the pitch nut 10 to hold the mechanism in any given adjustment. This is accomplished in the illustrative construction by use of a split nut 10 and an adjusting screw 13 operable to clamp the nut tightly on the sheave hub.

In the drawing 14 denotes a keyway in the sheave hub to receive a shaft key. 15 designates a collar carrying set screws to hold the hub from axial movement on the shaft and to secure the key 4 and the key in the keyway 14 against endwise movement. In the specific construction shown, the set screw 16 engages the shaft, and the set screws 17 and 18 bear respectively against the key 4 and the key in the keyway 14.

The sheave is shown in the drawing at one limit of adjustment, the confronting discs 2 and 3 of the respective pairs being in abutting relationship. The sheave may be adjusted to separate the discs of the respective pairs within the limit allowed by the space between the collar 15 and the adjacent disc.

The several interfitted parts of the sheave may have an easy sliding fit. The structure may be easily assembled. In assembling, the rings 11 and 12 are screwed into the nut 10, which is screwed on the sheave hub. The sheave discs 2 and 3, spacers and bolt screws 6 are then assembled on the hub, excepting the disc adjacent to the collar 15. After screwing the bolt screws 6 into the ring 11, the disc adjacent to the collar 15 is applied, and the bolt screws 8 are screwed into the ring 12. Finally the collar 15 is applied, and the set screws carried thereby are adjusted as required.

The fine and coarse pitch discs or rings 11 and 12, as well as the several sheave discs 2 and 3, are splined or keyed to the sheave hub by means of the key 4, but free for axial movement. In other words the pitch rings 11 and 12 together with the sheave discs are slidably mounted on the hub, but non-rotatable relative thereto.

The hub 1 typifies a "rotatable central support," which term may be construed as applying either to the sheave hub or shaft or to the hub and shaft combined. A "sheave" may be one having a disc carrying hub member for application to a shaft, as in the case of the illustrative sheave, or one in which the sheave discs are carried directly by the shaft in driving connection therewith.

By employing a sheave embodying the invention in a V-belt drive or analogous drive, it is apparent that accurate adjustment of the speed of the driven shaft relative to the driving shaft can be obtained within the limits allowed by adjustability of pitch diameter of such sheave. The variable pitch sheave is preferably employed as a motor sheave or driving sheave in such drive.

It will be understood that the invention is not intended to be limited to the specific embodiment shown. Subject-matter of the invention is applicable both to single grooved and multiple grooved sheaves.

I claim as my invention:

1. An adjustable grooved sheave having oppositely axially adjustable groove side walls, a rotatable adjuster having screw-threaded engagement with screw threads in fixed relation to the sheave hub or shaft, and a pair of axially movable members in screw-threaded engagement with said adjuster and operable thereby to move simultaneously in opposite directions, the screw threads between said adjuster and members being respectively of greater and less pitch than the first mentioned screw threads, all of said screw threads being right handed or left handed, said members being respectively connected with the respective oppositely axially adjustable side walls.

2. An adjustable grooved sheave having oppositely axially adjustable groove side walls, a rotatable adjuster having screw-threaded engagement with screw threads in fixed relation to the sheave hub or shaft, and a pair of axially movable members in screw-threaded engagement with said adjuster and operable thereby to move simultaneously in opposite directions, said members being respectively connected with the respective oppositely axially adjustable groove side walls, the relation of the first mentioned screw threads and those between the adjuster and said members being such that adjustment of said members and groove side walls connected therewith is accomplished by opposite movements in equal amounts, all of said screw threads being right handed or left handed.

3. An adjustable sheave having oppositely axially adjustable complemental groove side walls, oppositely axially movable rings respectively connected with the respective oppositely axially adjustable groove side walls, and an adjusting nut having screw-threaded engagement with the sheave hub or shaft and having fine and coarse pitch screw-threaded engagements with said rings respectively, whereby rotation of said nut relative to the sheave hub moves said rings and the groove side walls respectively connected therewith simultaneously in opposite directions.

4. An adjustable sheave having oppositely axially adjustable complemental groove side walls, oppositely axially movable rings respectively connected with the respective oppositely axially adjustable groove side walls, and an adjusting nut having screw-threaded engagement with the sheave hub or shaft and having fine and coarse pitch screw-threaded engagements with said rings respectively, the three sets of screw threads having such relations that rotation of said nut will move said rings and the complemental side walls connected therewith equal amounts in opposite directions.

5. An adjustable sheave having two inter-arranged and oppositely axially adjustable units each comprising spaced discs alternating and cooperating with those of the other to provide belt grooves, an adjusting nut in screw-threaded engagement with the sheave hub or shaft, and a pair of axially adjustable rings slidable on but non-rotatable relative to the hub or shaft and respectively connected with the respective units and with which said nut has relatively fine and coarse screw-threaded engagements.

6. An adjustable sheave having a rotatable central support, a pair of discs mounted thereon in driving connection therewith and cooperating to form a belt groove, said discs being axially adjustable toward and from each other, an adjusting nut in screw-threaded engagement with said support, axially movable means rigid with one of said discs and with which said nut has relatively fine pitch screw-threaded engagement, and axially movable means rigid with the other disc and with which said nut has relatively coarse pitch screw-threaded engagement, whereby rotation of said nut relative to said support moves said two means and discs respectively connected therewith simultaneously in opposite directions.

7. An adjustable sheave having a rotatable central support, a pair of discs mounted thereon in driving connection therewith and cooperating to form a belt groove, said discs being axially adjustable toward and from each other, an adjusting nut in screw-threaded engagement with said support, axially movable means rigid with the disc which is at the same side of the groove center as said nut and with which said nut has relatively fine pitch screw-threaded engagement, and axially movable means rigid with the other disc and with which said nut has relatively coarse pitch screw-threaded engagement, whereby rotation of said nut relative to said support moves said two means and discs respectively connected therewith simultaneously in opposite directions.

8. An adjustable sheave comprising a rotatable central support, spaced pairs of axially adjustable discs carried by said support in driving connection therewith, the discs of each pair cooperating to form a belt groove, the whole series of discs being in two relatively axially movable groups each comprising corresponding discs of the respective pairs connected in spaced relationship for axial movement as a unit, an adjusting nut having screw-threaded engagement with said support, and oppositely axially movable rings slidable but non-rotatable relative to said support and respectively connected with the respective groups of discs and with which said nut has fine and coarse screw-threaded engagements respectively.

9. An adjustable sheave comprising a rotatable central support, spaced pairs of axially adjustable discs carried by said support in driving connection therewith, the discs of each pair cooperating to form a belt groove, a pair of rings slidable on but non-rotatable relative to said support and movable toward and away from each other, spacers and tie rods connecting for movement as a unit one of said rings and the discs forming the right hand groove walls, other tie rods and spacers connecting for movement as a unit the other of said rings and the discs forming the left hand groove walls, the spacers for each group of axially movable elements being tubular and slidable in holes therefor in the intervening elements of the other group and the tie rods for each group passing through the spacers thereof, and an adjusting nut in screw-threaded engagement with said support, said nut having relatively fine pitch screw-threaded engagement with one of said rings and relatively coarse pitch screw-threaded engagement with the other of said rings, whereby rotation of said nut relative to said support moves said rings and the units respectively connected therewith simultaneously in opposite directions.

10. An adjustable sheave having two relatively axial movable groups of spaced discs arranged in alternating relationship and cooperating to form belt grooves, a rotatable central support on which said groups of discs are mounted in driving connection therewith but movable axially thereon, a pair of rings slidable on said support but non-rotatable relative thereto and arranged beyond one end of the entire series of discs, means rigidly connecting in spaced relationship the ring furthest from said series with the discs at the same side of the groove centers as said ring, means rigidly connecting in spaced relationship the other ring and the other discs, and a rotatable adjusting nut in screw-threaded engagement with said support and having relatively fine pitch screw-threaded engagement with one of said rings and relatively coarse pitch screw-threaded engagement with the other of said rings.

11. An adjustable sheave having two relatively axially movable structures each comprising a disc and ring and means rigidly connecting them in spaced relationship, the disc and ring of one structure arranged in alternation with the disc and ring of the other structure and the two discs cooperating to provide a belt groove, a rotatable central support having said discs mounted thereon in driving connection therewith but axially movable relative thereto, said rings being slidably mounted on said support but non-rotatable relative thereto, said support having a fixed screw portion, said rings being between said screw portion and said discs, and an adjusting nut engaging said screw portion and having relatively fine pitch screw-threaded engagement with one of said rings and coarse pitch engagement with the other, all the screw threads being right handed or left handed, whereby rotation of said nut moves said rings and discs connected therewith simultaneously in opposite directions.

12. An adjustable sheave having complemental groove-forming components movable axially toward and away from each other, three screws coaxial with said components including a screw fixed relative to the sheave axis and two axially shiftable screws respectively rigid with the respective oppositely movable components, and a rotatable adjuster having three screw threads respectively corresponding to and engaging those of the three screws, all of said screws being right handed or left handed and the threads of said axially shiftable screws being one of fine pitch and the other of coarse pitch as compared with the thread of said fixed screw, whereby rotation of said adjuster causes simultaneous movements of said complemental components in opposite directions.

13. An adjustable sheave having complemental groove-forming components movable axially toward and away from each other, three screws coaxial with said components including a screw fixed relative to the sheave axis and two axially shiftable screws respectively rigid with the respective oppositely movable components, and a rotatable adjuster having three screw threads respectively corresponding to and engaging those of the three screws, all of said screws being right handed or left handed and the threads of said axially shiftable screws being one of fine pitch and the other of coarse pitch as compared with the thread of said fixed screw, whereby rotation of said adjuster causes simultaneous movements of said complemental components in opposite directions, the relation of the screw threads being in accordance with the formula $$(1/n_1 - 1/n_2) = (1/n_3 - 1/n_1)$$

where $n_1$, $n_2$ and $n_3$ are respectively the numbers of threads per inch of said fixed screw, fine pitch screw and coarse pitch screw.

NELS E. NYLIN.

CERTIFICATE OF CORRECTION.

Patent No. 2,254,045.                                         August 26, 1941.

NELS E. NYLIN.

It is hereby certified that error appears in the printed specification of the above numbered patent requiring correction as follows: Page 2, first column, line 59, for the equation " $1/8" - 1/5" = 3/40"$ " read -- $1/8" - 1/5" = -3/40"$ --;

page 3, second column, line 75, claim 10, for "axial" read --axially--; and that the said Letters Patent should be read with this correction therein that the same may conform to the record of the case in the Patent Office.

Signed and sealed this 7th day of October, A. D. 1941.

(Seal)                                                                    Henry Van Arsdale,
Acting Commissioner of Patents.